United States Patent [19]

Hirakawa et al.

[11] 4,010,677
[45] Mar. 8, 1977

[54] APPARATUS FOR POSITIONING HEADS

[75] Inventors: Tadashi Hirakawa; Noriyuki Hoshino, both of Mihara, Japan

[73] Assignee: Mitsubishi Jukogyo Kabushiki Kaisha, Tokyo, Japan

[22] Filed: June 10, 1975

[21] Appl. No.: 585,712

[30] Foreign Application Priority Data

June 14, 1974 Japan .............................. 49-67046
June 18, 1974 Japan ......................... 49-70363[U]

[52] U.S. Cl. ............................... 93/58.2 R; 83/11; 83/499
[51] Int. Cl.² ......................................... B26D 3/08
[58] Field of Search ...................... 83/11, 499, 522; 93/58.2 R

[56] References Cited

UNITED STATES PATENTS

| | | | |
|---|---|---|---|
| 3,332,326 | 7/1967 | Haas | 93/58.2 R |
| 3,470,776 | 10/1969 | Brichard et al. | 83/11 |
| 3,834,258 | 9/1974 | Zumstein | 83/504 X |
| 3,882,764 | 5/1975 | Johnson | 83/499 X |

*Primary Examiner*—Willie G. Abercrombie
*Attorney, Agent, or Firm*—Cushman, Darby & Cushman

[57] ABSTRACT

An apparatus for positioning a plurality of heads slidably disposed along a shaft on, in which said respective heads are disposed and set at any desired positions through the steps of conveying said heads either individually or in groups each consisting of two or more heads by means of a shifter, isolating each said head from said shifter to set it when it reaches a desired position, and repeating the aforementioned operations. Said shifter is constructed of a slave shifter provided with means for holding and releasing said head and a master shifter provided with means for reciprocating said slave shifter along said shaft by a predetermined distance relative to said master shifter.

6 Claims, 25 Drawing Figures

Figure 13:
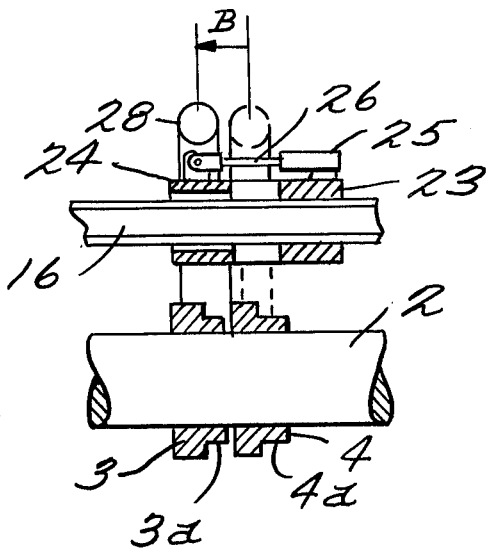

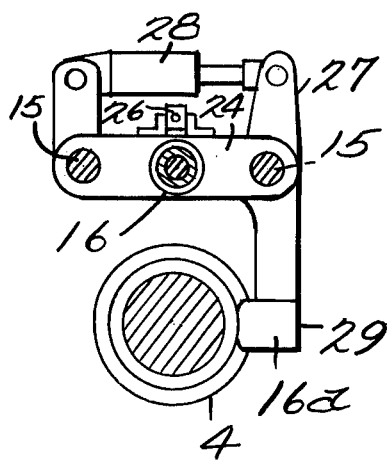
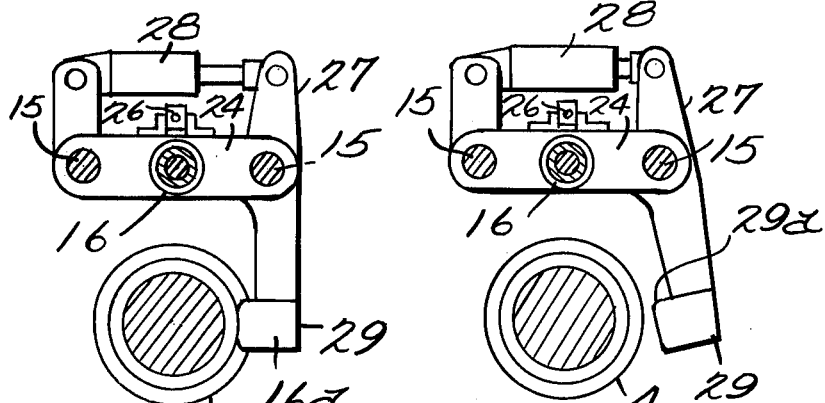
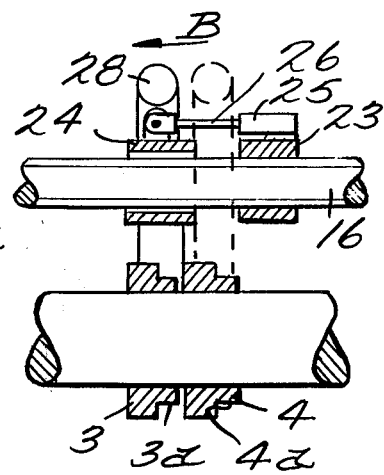
Fig. 8.     Fig. 9.     Fig. 10.
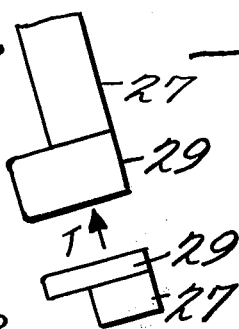
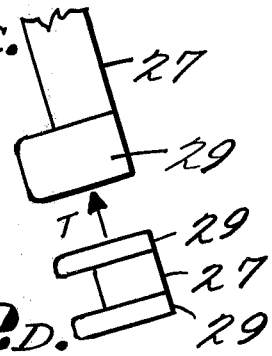
Fig. 12A.     Fig. 12C.
Fig. 12B.     Fig. 12D.
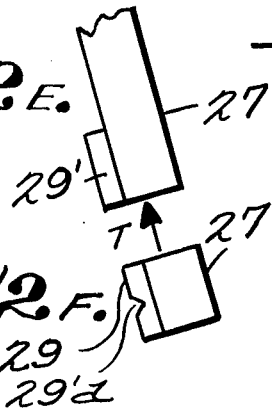
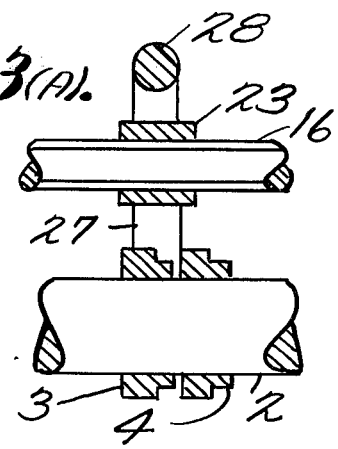
Fig. 12E.
Fig. 12F.     Fig. 13(A).

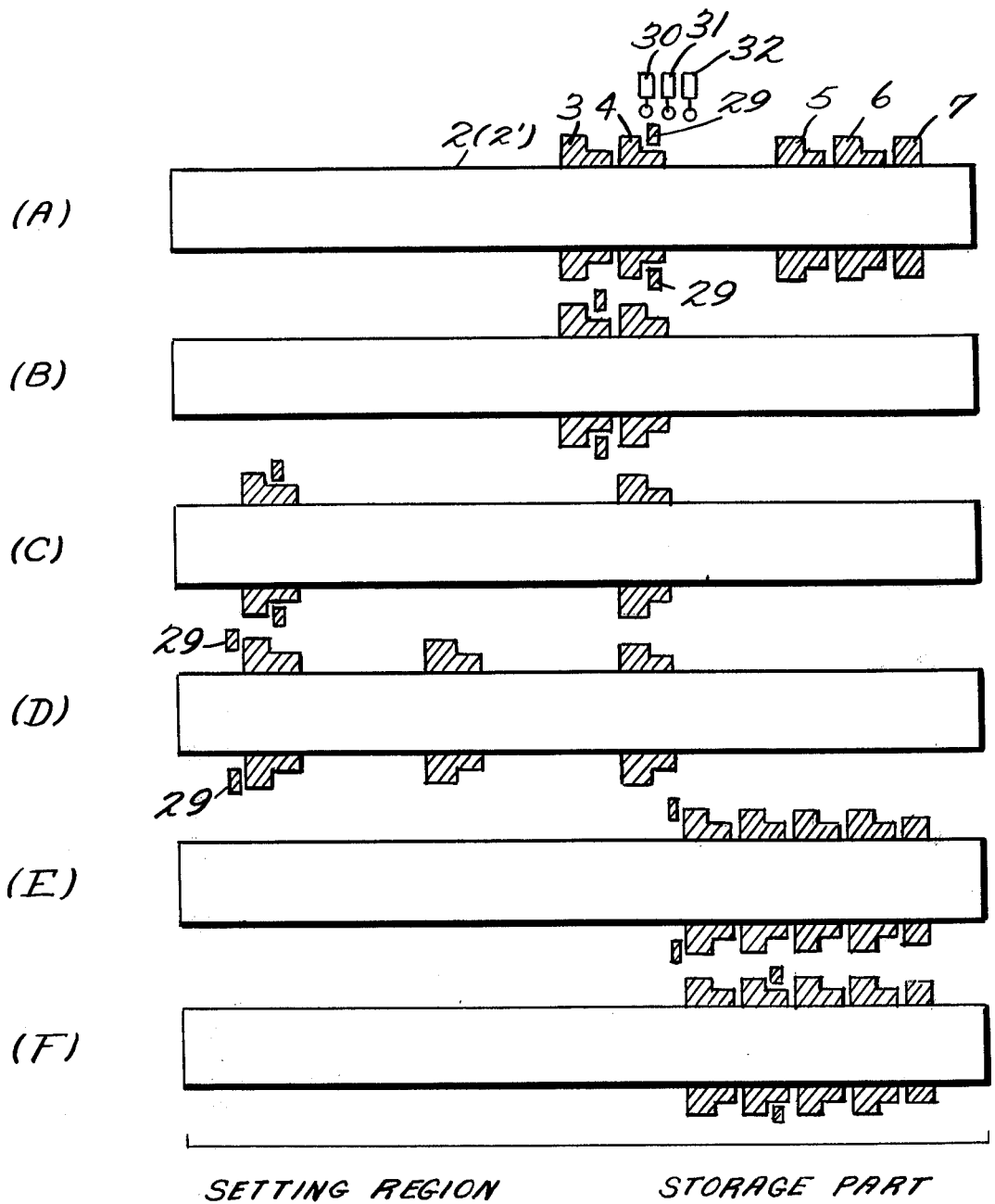

APPARATUS FOR POSITIONING HEADS

The present invention relates to an apparatus for positioning heads in a machine which has a uniaxial multi-head structure and which necessitates to position said heads (working tools) such as, for example, a corrugate machine, a slitter-scorer, etc.

In a slitter-scorer for slitting a web of corrugated paperboard into a number of strips and also making score lines in each strip, it is usually necessary to change positions of a plurality of heads for modifying the slitting dimensions and the score line intervals. The conventional method for positioning the heads as practiced in a slitter-scorer in the prior art will be described at first with reference to FIGS. 1 and 2.

Figure 1:
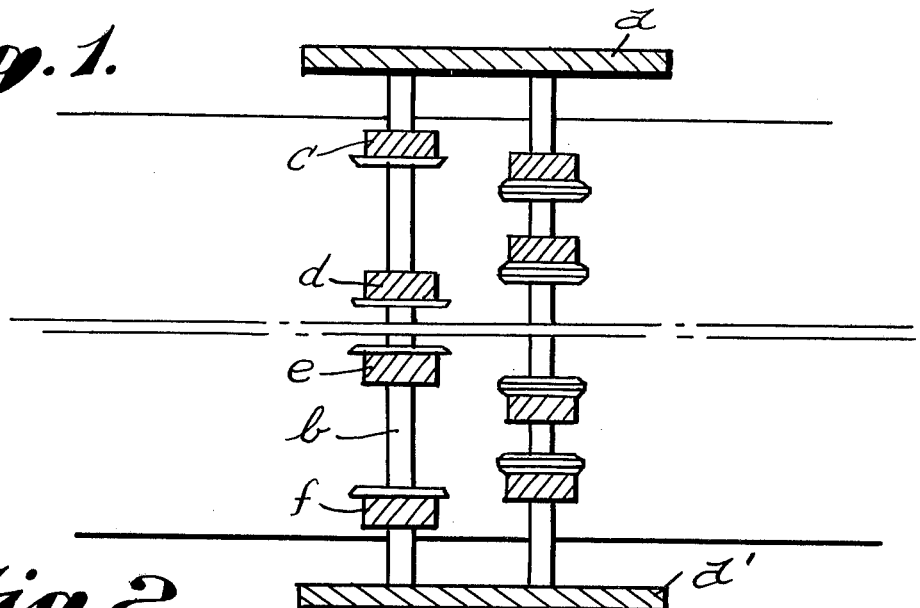
Figure 2:
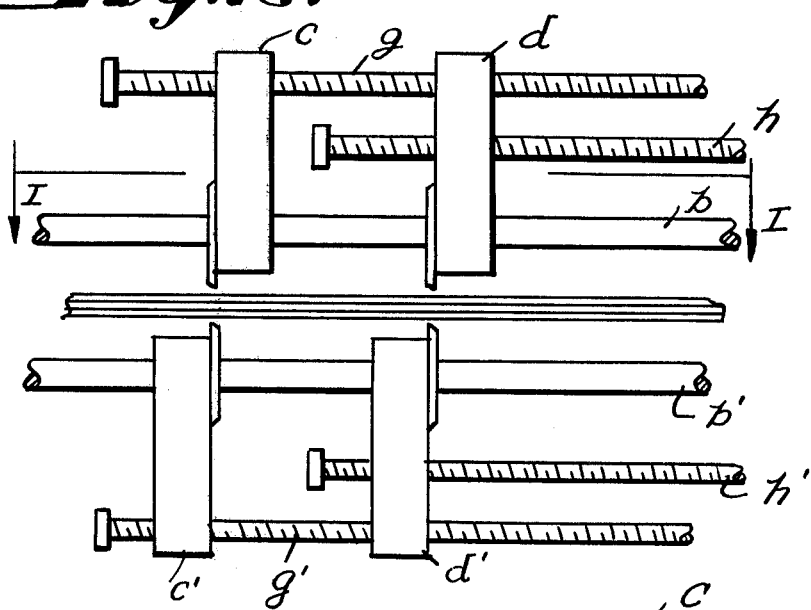
Figure 3:
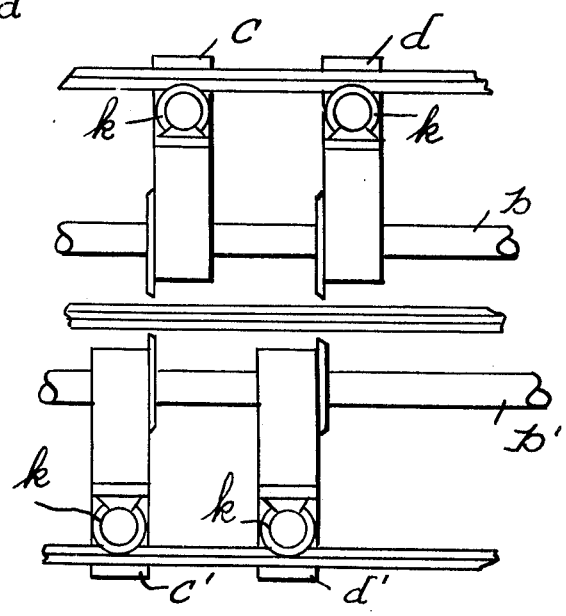

In FIGS. 1 and 2, reference characters (a) and (a') designate a pair of machine frames, reference characters (b) and (b') designate upper and lower rotary shafts, respectively, mounted in parallel to each other on said machine frames (a) and (a'), reference characters (c) – (f) and (c') - (f')(e') and (f') being not shown in these figures) designate a plurality of heads slidably mounted on said shafts (b) and (b'), respectively, reference characters (g) and (g'), (h) and (h'), (i) and (i') not shown, and (j) and (j') designate screw shaft pairs threadedly engaged with said head pairs (c) and (c'), (d) and (d'), (e) and (e'), and (f) and (f'), respectively, and the respective screw shafts (g) - (i) and (g') - (i') are respectively provided with driving power sources (not shown), so that said heads are adapted to be displaced by energizing said respective driving power sources to drive the respective screw shafts. FIG. 3 shows another example of the conventional apparatus in which motors (k) are mounted to the respective heads (c) - (f) and (c') - (f') so that the respective heads may be displaced in position.

The aforementioned apparatus for positioning heads in the prior art comprises a driving power source or a motor (k) for each head. In case that there are a large number of driving power sources as described above, it is necessary to control all the driving power sources simultaneously in a control system for the driving power sources, and therefore, the positioning apparatus had shortcomings that the control unit is large-sized and complexed, resulting in a high cost of the positioning apparatus.

The present invention has been worked out to resolve the aforementioned problems, and it is a principal object of the present invention to provide an improved apparatus for positioning heads in which a control system can be simplified and small-sized.

It is another object of the present invention is to provide an improved apparatus for positioning heads in which a low speed movement interval for setting the head is unnecessary, a total setting time for all the heads can be shortened, and a control system for the apparatus can be simplified.

According to one feature of the present invention, there is provided an apparatus for positioning a plurality of heads provided slidably along a shaft, in which said respective heads are disposed and set at any desired positions along said shaft through the steps of conveying said heads either individually or in groups each consisting of two or more heads by means of a shifter, isolating each said head from said shifter to set it when it reaches a desired position, and repeating the aforementioned operations, characterized in that said shifter is constructed of a slave shifter provided with means for holding and releasing said head and a master shifter provided with means for reciprocating said slave shifter along said shaft by a predetermined distance relative to said master shifter.

Since the method for positioning a plurality of heads provided slidably along a shaft according to the present invention is characterized in that said respective heads are disposed and set at any desired positions along said shaft through the steps of conveying said heads either individually or in groups each consisting of two or more heads by means of a shifter, isolating each said head from said shifter to leave it when it reaches a desired position, and repeating the aforementioned operations as described above, the number of the shifters can be reduced to one at the minimum, that is, the number of driving systems for moving the shifters can be reduced to one at the minimum. Because the setting of the plurality of heads can be achieved through positioning control for one shifter at the minimum as described above, the number of units (driving power sources and the like) to be controlled can be made small and thus the control system can be simplified and small-sized.

Since the apparatus for positioning heads according to the present invention is constructed as described above, a low speed movement interval for setting the head is unnecessary and a total setting time for all the heads can be shortened. More particularly, when the master-slave shifter conveys the head group up to a first setting point and stops there, the slave shifter is in contact with the master shifter and the hold-release means provided on the slave shifter holds a head to be set at that setting point. Subsequent operations are as follows: — The hold-release means operates in the direction for separating from the head to release the same head, and thus the setting at the first setting point is completed. Nextly, the reciprocating means on the master shifter operates to advance the slave shifter and the hold-release means provided thereon by a predetermined distance so that the hold-release means may be opposed to the head to be conveyed and set secondly. Then the hold-release means is actuated towards the head to hold the same. Subsequently, the movement of the master shifter is restarted, and soon the master shifter is brought in contact with the slave shifter. Thereafter the masterslave shifter and the head move jointly towards a second setting point, and when they come to the second setting point the head is set in a similar manner to the first head. The above-mentioned is the operations in case that the number of heads to be set in one cycle is two, and in case of three or more heads similar operations are repeated at the subsequent setting points. As described above, the positioning apparatus according to the present invention is constructed in such manner that at each setting point firstly the master-slave shifter stops, a head to be set there is released, then only the slave shifter advances by a predetermined distance and holds a head to be set subsequently, and finally the master-slave shifter advances jointly. In other words, before start of movement of the master shifter the head to be set subsequently is held by the slave-shifter. This implies that the master shifter could be moved at a high speed from the time point of starting movement, and therefore, the positioning apparatus according to the present invention can shorten the total setting time of all the heads in comparison to the conventional positioning apparatus in which a head to be set nextly is held by a shifter while the shifter is being moved at a low speed.

In addition, since the positioning apparatus according to the present invention is constructed, as described above, in such manner that after the master-slave shifter has stopped, the hold-release means on the slave shifter having been actuated to release the head to be set there, and thus the setting of the head has been completed, the reciprocating means on the master shifter operates to advance only the slave shifter by a predetermined distance and then the hold-release means on the slave shifter is actuated in the opposite direction to the above-mentioned first actuation to hold the head to be set subsequently, the subject apparatus has an advantage that the holding position of the hold-release means relative to the head is kept constant, and thereby positioning errors caused by a difference in a holding position can be prevented.

The movement of the aforementioned slave shifter in the axial direction of the shaft is achieved by the reciprocating means provided on the master shifter, while the movement of the master shifter in the axial direction of the shaft is achieved by means of a screw shaft, so that the master shifter is only required to repeat the operations of high speed movement and stoppage as described above. Therefore, the control system for controlling the driving power source for the screw shaft merely performs control with a small number of gear stages, and so the control system becomes simple and less expensive.

Figure 4:
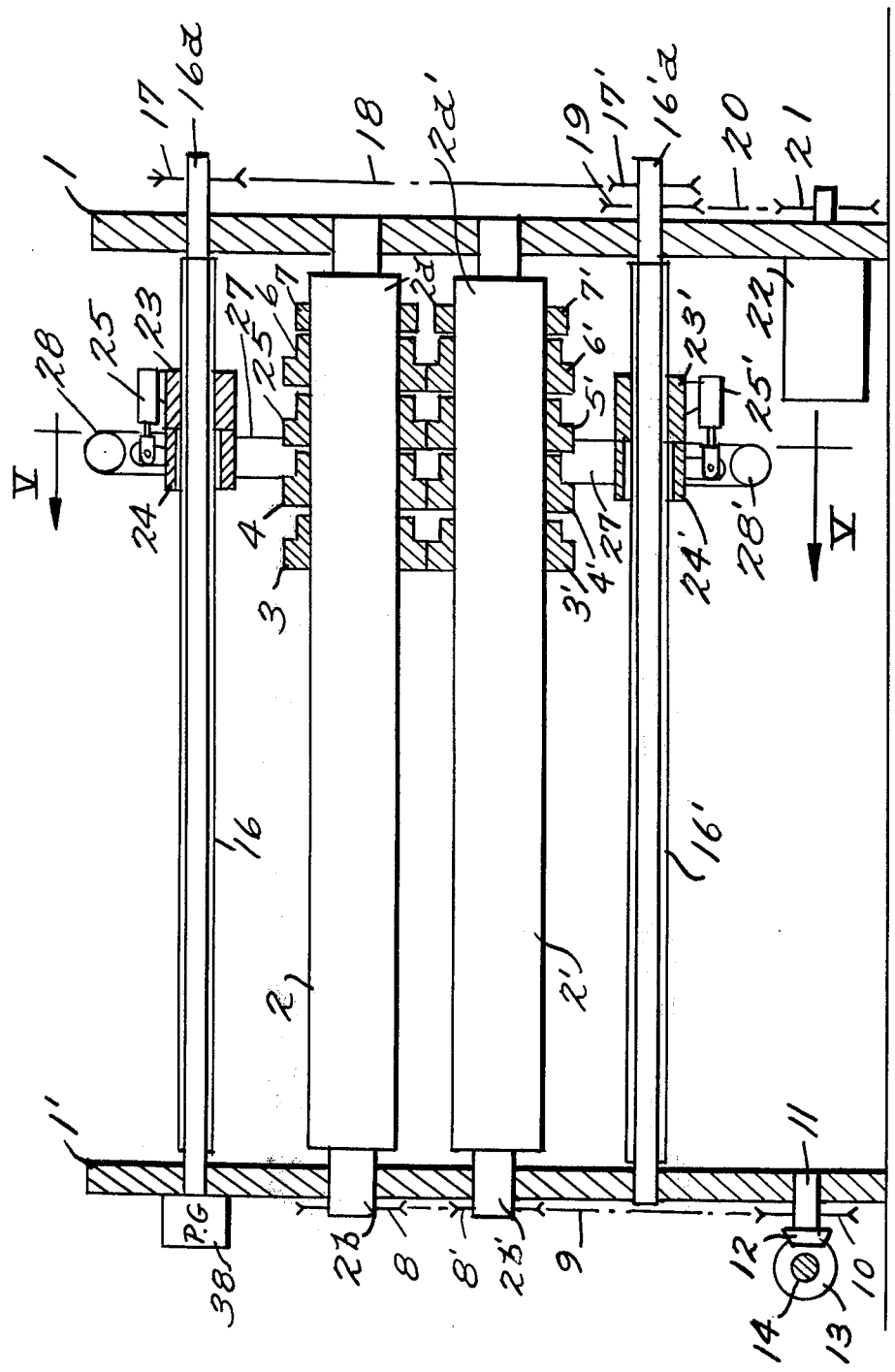
Figure 5:
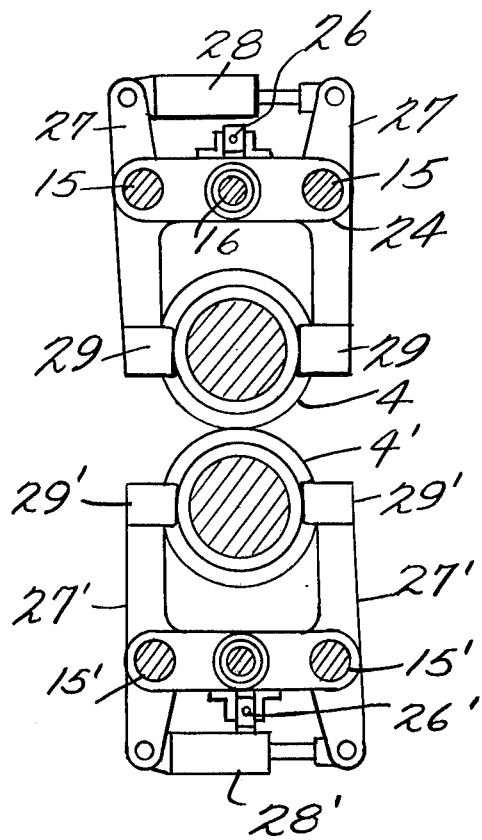
Figure 6:
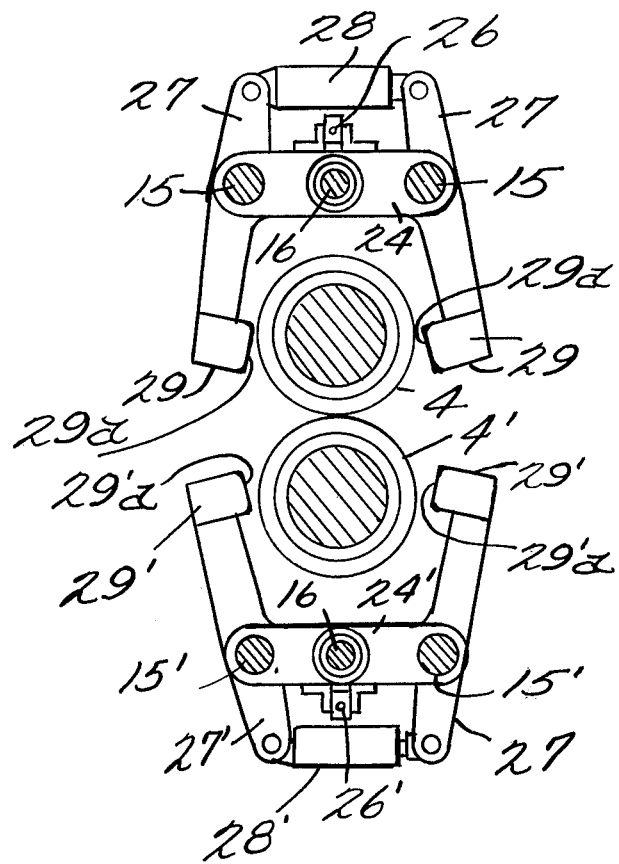
Figure 7:
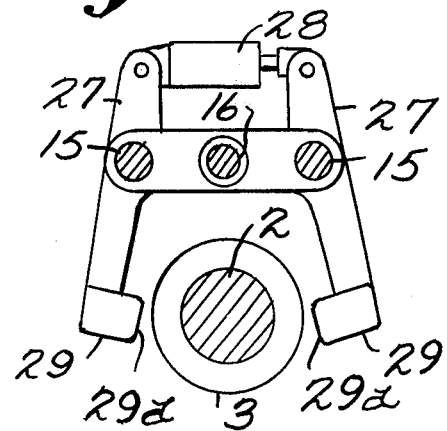
Figure 14:
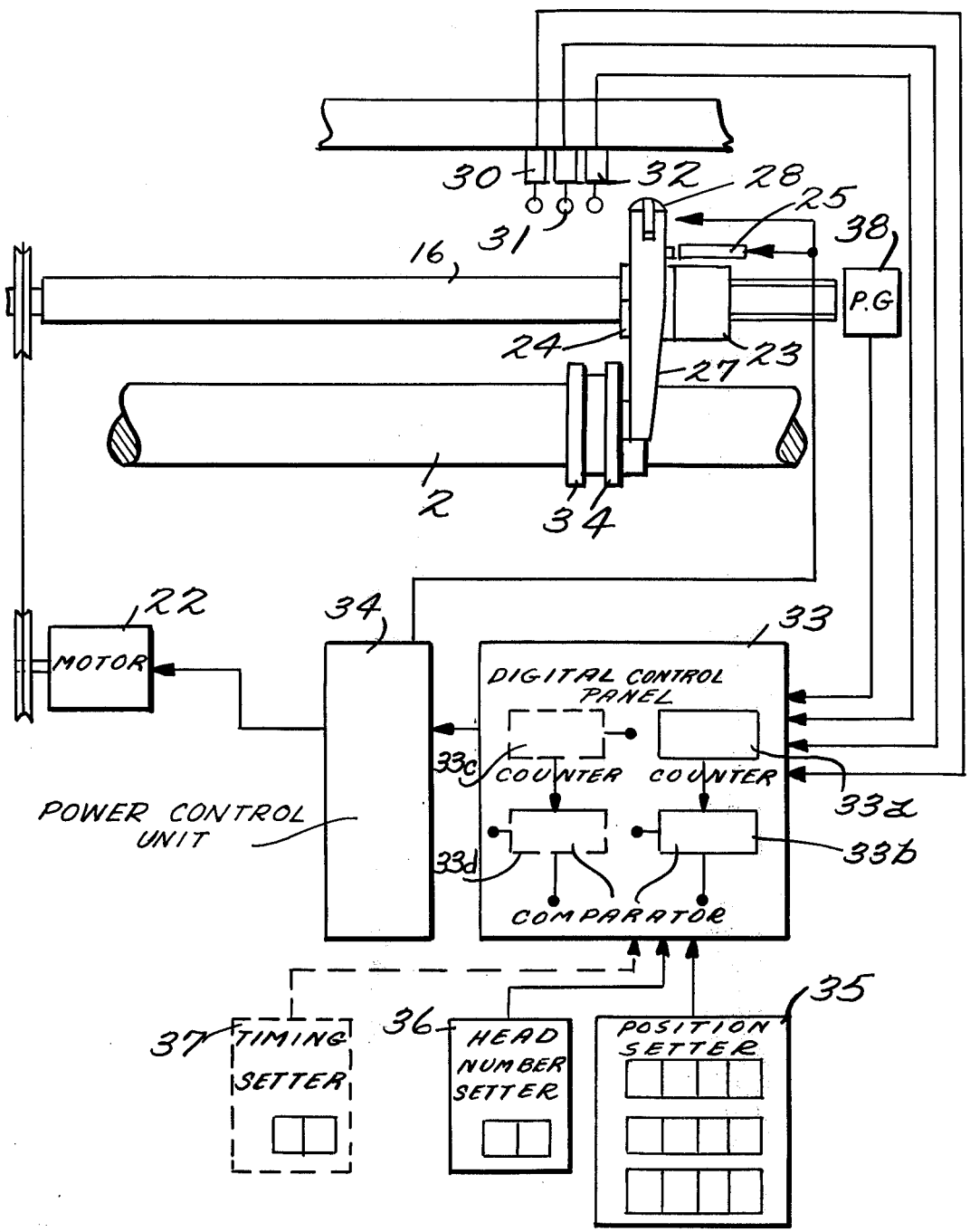

Above-mentioned and other features and advantages of the present invention will become more apparent by reference to the following description taken in conjunction with the accompanying drawings, in which:

FIG. 1 is a transverse cross-section side view taken along line I — I in FIG. 2 as viewed in the direction of arrows, showing a head positioning apparatus in the prior art, FIGS. 2 and 3 are front views showing different examples of the prior art positioning apparatus, FIG. 4 is a longitudinal cross-section front view showing one preferred embodiment of the apparatus to be used for practicing the method of positioning heads according to the present invention, FIGS. 5 and 6 are longitudinal cross-section side views taken along line V — V in FIG. 4 as viewed in the direction of arrows, showing two different states of a slave shifter, respectively, FIG. 7 is a longitudinal cross-section front view showing the mode of operation of the master-slave shifter in the subject apparatus, FIGS. 8 and 9 are longitudinal cross-section side views showing a slave shifter in another embodiment of the head positioning apparatus according to the present invention in two different states, respectively, FIG. 10 is a longitudinal cross-section front view of the master-slave shifter in the embodiment of FIGS. 8 and 9, showing the relation between the master shifter and the slave shifter which has advanced by a predetermined distance, FIGS. 11(A) to (F) are diagrammatic views showing the successive steps of the setting operation of the heads, FIG. 12(A) is a side view showing one example of a contact plate, FIG. 12(B) is a bottom view of the same contact plate as viewed in the direction of an arrow in FIG. 12(A), FIG. 12(C) is a side view showing another example of a contact plate, FIG. 12(D) is a bottom view of the same contact plate as viewed in the direction of an arrow in FIG. 12(C), FIG. 12(E) is a side view showing still another example of a contact plate, FIG. 12(F) is a bottom view of the same contact plate as viewed in the direction of an arrow in FIG. 12(E), FIG. 13(A) is a longitudinal cross-section front view showing another embodiment of the shifter, FIG. 13(B) is a longitudinal cross-section side view of the same shifter, and FIG. 14 is a diagram of a control system for the head positioning apparatus according to the present invention.

Now the method and apparatus for positioning heads according to the present invention will be described in connection to its one preferred embodiment illustrated in FIGS. 4 to 7.

In FIG. 4, reference numerals 1 and 1' designate a pair of machine frames, numeral 2 and 2' designate a pair of shafts which are rotatably mounted on the machine frames 1 and 1', numerals 3 – 6 and 3' – 6' designate heads provided slidably along the shafts 2 and 2', respectively, numerals 7 and 7' designate stoppers mounted on the shaft 2 and 2', respectively, at their drive side end portions 2a and 2a', numerals 8 and 8' designate sprockets mounted on the same shafts 2 and 2', respectively, at their operation side end portions 2b and 2b', numeral 11 designates a rotary shaft mounted at the lower portion of the frame 1', numeral 10 designates a sprocket integrally mounted on the rotary shaft 11, numeral 9 designates an endless chain provided around the sprockets 8, 8' and 10, numeral (14) designates a line shaft, numerals 12 and 13 designate bevel gears for coupling the respective shafts 11 and 14, and so, the shafts 2 and 2' are adapted to be driven by the intermediary of the line shaft 14, bevel gears 13 and 12, shaft 11, sprocket 10, chain (9) and sprockets 8 and 8'.

In FIGS. 5 and 6, reference numeral 15 designates a pair of shafts mounted on the frames 1 and 1' above and in parallel to the shaft 2, reference numeral 15' designates a similar pair of shafts mounted on the frames 1 and 1' under and in parallel to the shaft 2', numeral 16 designates a screw shaft rotatably mounted on the frames 1 and 1' at the midpoint between the shafts 15 in parallel to the same shafts 15 and the shaft 2, and numeral 16' designates another screw shaft rotatably mounted on the frames 1 and 1' at the midpoint between the shafts 15' in parallel to the same shafts 15' and the shaft 2'.

Again with reference to FIG. 4, reference numerals 17 and 17' designate sprockets mounted on the respective screw shafts 16 and 16' at the drive side end portions 16a and 16a', respectively, numeral (18) designates an endless chain provided around the respective sprockets 17 and 17', numeral 19 designates another sprocket mounted at the same end portion 16a', numeral 22 designates an electric motor mounted at the lower portion of the machine frame 1, numeral 21 designates a sprocket mounted on the output shaft end of the motor 22, numeral 20 designates an endless chain provided around the respective sprockets 19 and 21, and the screw shaft 16' is adapted to be driven in rotation by the motor 22 by the intermediary of the sprocket 21, chain (20) and sprocket (19), while the screw shaft 16 is adapted to be driven in rotation by the same motor (22) further by the intermediary of the sprocket (17'), chain 18 and sprocket 17 in addition to the abovereferred driving elements.

Reference numeral 23 designates a master shifter that is slidably fitted about the shafts 15 and also threadedly engaged with the screw shaft 16, numeral 24 designates a slave shifter loosely fitted about the respective shafts 15 and 16, numeral 25 designates a hydraulic cylinder device mounted on the master shifter 23, numeral 26 designates a piston rod extending towards the slave shifter 24 and having its tip end mounted at the central upper portion of the slave shifter 24, and if the piston rod 26 is extended, the slave shifter 24 would advance relative to the master shifter 23 by a predetermined distance represented by B in FIG. 7, while if the piston rod 26 is contracted, the slave shifter 24 would be restored to the position adjacent to the master shifter 23 as represented by double dot chain lines in FIG. 7. Reference numerals 24' – 26' are component parts on the side of the shaft 15' and the screw shaft 16' similar to the component parts 24 – 26, and they are adapted to be operated exactly in the same manner.

In FIGS. 5 and 6, reference numeral 27 designates a pair of arms pivotably mounted at the opposite ends of the slave shifter 24, numeral 28 designates a hydraulic cylinder device mounted at one end of each said arm 27, numeral 29 designates contact plates provided at the other end of each said arm 27, and when the hydraulic device 28 is extended as shown in FIG. 5, the respective arms 27 are rocked in the opposite directions to each other, and so the contact plates 29 approach to each other so that the tip end 29a of each said contact plate 29 may be inserted into a lower step portion (4a) of the head 4 or else into a lower step portion 3a, 5a or 6a of the head 3, 5 or 6. The component parts 27' – 29' are similar parts to the component parts 27 – 29 on the side of the shafts 15' and the screw shaft 16', and they are adapted to be operated exactly in the same manner.

Now the operation of the above-described positioning apparatus will be explained with reference to FIGS. 11 and 14. In case that the heads 3 – 6 and 3' – 6' are to be set at next slitting positions or at next score line positions, a position change signal is transmitted to the positioning apparatus. When this signal is transmitted, the motor 22 is driven in the positive direction, so that the slave shifters 24 and 24' located at the positions shown in FIG. 8 (It is to be noted that in FIG. 11 the positions of the slave shifters 24 and 24' are represented as replaced by the contact plates 29 and 29', respectively.) move towards a storage section (in the rightward direction), and eventually the slave shifter 24 would actuate a limit switch 30 disposed in front of the entrance of the storage section. The motor 22 is decelerated in response to a deceleration signal then obtained. Subsequently the slave shifter 24 would actuate another limit switch 31. The motor 22 would be stopped in response to a stop signal then obtained, and in this way the return to an origin of the slave shifters 24 and 24' has been completed. By this moment, the masterslave shifters 23–24 and 23'–24' take the relative position represented by solid lines in FIG. 7. Also the arms 27 and 27' take the positions shown in FIG. 5. The origin return positions of the slave shifters 24 and 24' are shown in FIG. 11(E). The arms 27 and 27' take the positions shown in FIG. 5 as described previously. On the other hand, the slave shifters 24 and 24' would move from the position shown in FIG. 11(D) to the position shown in FIG. 11(E). Accordingly, the respective heads 3 – 6 and 3' – 6' are collected in the storage section as shown in FIG. 11(E). Then a storage search instruction is transmitted from the digital control panel 33 in FIG. 14. When this instruction has been transmitted, the hydraulic pressure cylinder devices 28 and 28' on the slave shifters 24 and 24' are actuated in the direction of contraction, and thereby the arms 27 and 27' are displaced to the positions shown in FIG. 6. Subsequently, the hydraulic cylinder devices 25 and 25' are actuated in the direction of contraction, so that the slave shifters 24 and 24' are brought in contact with the master shifters 29 and 29' as shown by double dot chain lines in FIG. 7. The master-slave shifters 23 – 24 and 23' – 24' start movement in the rightward direction in order to search for the head designated by a head number setter 36 in FIG. 14. The motor 22 is decelerated after the designated number of heads have been passed (in the illustrated example, after two heads have been passed) in response to an instruction given by a digital control panel 33, and thus the motor 22 stops. When the master-slave shifters 23–24 and 23'–24' have stopped, the hydraulic cylinder devices 28 and 28' are actuated in the direction of extention, so that the arm 27 and 27' are displaced to the positions shown in FIG. 5. In this way the storage search has been completed. This state is shown in FIG. 11(F). Subsequently, a setting instruction is transmitted from the digital control panel 33. When this instruction has been transmitted, the heads 3 and 4 and the master-slave shifter 23–24, and the heads 3' and 4' and the master-slave shifter 23'–24', respectively, start movement jointly towards a setting region (in the leftward direction). When the master-slave shifter 23–24' passes through the position of a limit switch 32, that switch 32 is actuated to apply an origin signal to the digital control panel 33, and in response to that signal a counter 33a in the digital control panel (33) starts to count the pulses transmitted from a pulse generator (38) associated with the screw shaft 16 (See FIGS. 4 and 14). The count number of the counter 33a and a set value in a position setter 35 are compared to each other in a comparator 33b, and upon coincidence of these values a stop instruction is transmitted to stop the motor 22. This state is shown in FIG. 11(A). As the shifters 23–24 and 23'–24' stop, the hydraulic cylinder devices 28 and 28' are actuated in the direction of contraction, and the arms 27 and 27' are displaced to the positions shown in FIG. 6. Subsequently, the hydraulic cylinder devices 25 and 25' are actuated in the direction of extension, and the slave shifters 24 and 24' displace from the position shown by double not chain lines to the position shown by solid lines in FIG. 7. Then the hydraulic cylinder devices 28 and 28' are actuated in the direction of extension, so that the arms 27 and 27' are displaced to the positions shown in FIG. 5 and the contact plates 29 and 29' hold the lower step portions of the heads 3 and 3', respectively. This state is the state where the heads 4 and 4' have been released of the holding action of the master-slave shifter 23–24 and 23'–24', respectively, and at this moment the setting of the heads 4 and 4' has been completed. This state is shown in FIG. 11(B).

Thereafter, the master-slave shifters 23–24 and 23'–24' start movement in the leftward direction for setting the heads 3 and 3', respectively. Then the counter (33a) starts counting, and when this count number and the set value for the heads 3 and 3' within the position setter 35 coincide to each other, a stop instruction is transmitted to stop the motor 22. When the shifters 23–24 and 23'–24' stop, the hydraulic cylinder devices 28 and 28' are actuated in the direction of contraction, and the arms 27 and 27' are displaced to the positions shown in FIG. 6. Subsequently, the hydraulic cylinder devices 25 and 25' are actuated in the direction of contraction, and the slave shifters 24 and 24' displace from the position shown by double dot chain lines to the position shown by solid lines in FIG. 7. Then the hydraulic cylinder devices 28 and 28' are actuated in the direction of extension, so that the arms 27 and 27' are displaced to the positions shown in FIG. 5, and thereby the setting of the heads 3 and 3' has been completed. Upon completion of the setting, the respective heads are fixedly secured onto the shafts with conventional means not shown. While the setting operation for two heads has been described above, it is a matter of course that upon setting a large number of heads they can be set at predetermined positions by repeating the aforementioned operations.

The above-described positioning method has the following advantages:

Because the setting of a large number of heads can be achieved only through position control of the shifters, the number of the devices to be controlled (such as a motor and the like) can be reduced, and so the control system can be simplified.

II. Since the heads are conveyed in groups each consisting of two or more heads and they are successively set, the setting time can be widely shortened in comparison to the case where conveying and setting are achieved after having returned to a home position for every head.

Though the above-described embodiment was such that the respective heads are first collected in the storage section from the set positions shown in FIG. 11(D) (See FIG. 11(E)) and then they are shifted leftwards to be set, they could be directly shifted from the set positions shown in FIG. 11(D) to the next setting positions, respectively. In addition, while only one shifter is provided for each shaft 2 or 2' in the abovedescribed embodiment, this arrangement could be modified in such manner that two or more shifters are provided for each shaft and the setting of the heads is shared by these shifters by modifying the control system such as the control panel (33) and power control unit (34) so as to be able to control the plurality of shifters.

FIGS. 8, 9 and 10 illustrate another embodiment of the shifter in which the aforementioned arm 27 is pivotably mounted only at one end of the slave shifter 24, and since the operation of this embodiment is substantially identical to that of the first embodiment, a more detailed explanation thereon will be omitted.

FIGS. 13(A) and 13(B) show still another embodiment of the shifter in which the above-described master-slave shifter 23–24 or 23'–24' is constructed of a single part, that is, only the master shifter part 23 or 23'. In FIGS. 13(A) and 13(B) also, component parts that are identical to those shown in FIGS. 4 to 10 are represented by like reference numerals. The shifter 23 is threadedly engaged with the screw shaft 16, and at the opposite ends of the shifter 23 are pivotably supported arms 27. Between one ends of the arms 27 is provided a hydraulic cylinder device 28, and at the other ends of the arms 27 are respectively mounted contact plates 29. When the cylinder device 28 is actuated in the direction of extension, the arms 27 are rocked so that the tip ends 29a of the contact plates 29 may be inserted into the lower step portion of the head 3. Furthermore, in order to actuate the arms 27 in the above-mentioned direction at controlled timing, within the digital control panel 33 in FIG. 11 are provided a timing control counter 33c and a comparator 33d in addition to the positioning control counter 33a and the comparator 33b, and still further a timing setter 37 is provided separately.

Now the operation of the modified head positioning apparatus in FIGS. 13(A) and 13(B) will be described. The difference in operation from the positioning apparatus shown in FIGS. 4 to 8 exists in the transfer operation from the state shown in FIG. 11(A) to the state shown in FIG. 11(B), and with respect to other operations they are identical. Explaining now the difference, when the shifter 23 starts movement in the leftward direction for setting the head 3, the timing control counter 33c also commences counting. Upon coincidence between the count number and the set value for the timing number, an instruction is transmitted from the comparator (33d) to the hydraulic cylinder device 28 to be extended, so that the cylinder device 28 extends to swing the arms 27 and thereby the tip ends 29a of the contact plates 29 are inserted into the lower step portion of the head 3. This state is shown in FIG. 11(B). Through the above-outlined steps, the modified shifter can achieve the same operations as the master-slave shifter 23–24 in FIGS. 4 to 7.

With regard to the methods for shifting the heads (3) – (6) and 3' – 6', there are a method of advancing the head while inserting the contact plate 29 into the lower step portion of the head as shown in FIGS. 9(A) and 9(B), a method of advancing the head while placing the contact plates 29 on the opposite sides of the higher step portion of the head (that is, by placing the higher step portion of the head between the contact plates 29 as shown in FIGS. 12(C) and 12(D), and a method of advancing the head while engaging an engagement part (29a') of the contact plate 29' with an engagement part of the head as shown in FIGS. 12(E) and 12(F). However, these methods are no more than some examples and they could be replaced by other methods with the same effects.

While the present invention has been described above in connection to its preferred embodiments, it is obvious that the present invention should not be limited to only such embodiments but many changes in design could be made without departing the spirit of the present invention.

What is claimed is:

1. Apparatus for selectively positioning a plurality of heads along a shaft comprising:
   an additional shaft located in parallel with said head-carrying shaft;
   a master shifter and a slave shifter supported by said additional shaft;
   means operatively connecting said master and slave shifters to selectively vary the spacing between said shifters along said additional shaft;
   drive means for displacing said shifters along the additional shaft; and
   means on said slave shifter for selectively engaging a head to position the head along its shaft when said shifters are displaced along the additional shaft.

2. Apparatus as set forth in claim 1 wherein said additional shaft is a screw shaft and wherein said drive means rotates the screw shaft to displace said shifters therealong.

3. Apparatus as set forth in claim 1, wherein said means connecting the master and slave shifters comprises a hydraulic cylinder and piston rod arrangement joined between said shifters.

4. Apparatus as set forth in claim 1, wherein said shifters are positioned with respect to the heads so as to permit movement of the shifters past the heads when said head-engaging means is out of engagement with a head.

5. Apparatus as set forth in claim 2, wherein said means connecting the master and slave shifters comprises a hydraulic cylinder and piston rod arrangement joined between said shifters.

6. Apparatus as set forth in claim 5, wherein said shifters are positioned with respect to the heads so as to permit movement of the shifters past the heads when said head-engaging means is out of engagement with a head.

* * * * *